(12) United States Patent
Akpan et al.

(10) Patent No.: US 10,576,374 B1
(45) Date of Patent: *Mar. 3, 2020

(54) FACILITATING USERS TO OBTAIN INFORMATION REGARDING LOCATIONS WITHIN A VIRTUAL SPACE

(71) Applicant: Electronic Arts Inc., Redwood City, CA (US)

(72) Inventors: Inyang Akpan, San Francisco, CA (US); Bryan Tsao, San Carlos, CA (US); Albert Wei, San Francisco, CA (US); John Kim, San Francisco, CA (US); David McNeill, San Francisco, CA (US); Kevin Chanthasiriphan, San Francisco, CA (US)

(73) Assignee: ELECTRONIC ARTS INC., Redwood, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/490,771

(22) Filed: Apr. 18, 2017

Related U.S. Application Data (63) Continuation of application No. 14/029,726, filed on Sep. 17, 2013, now Pat. No. 9,649,554.

(51) Int. Cl.
*A63F 13/537* (2014.01)
*A63F 13/58* (2014.01)
*A63F 13/79* (2014.01)

(52) U.S. Cl.
CPC ............ *A63F 13/537* (2014.09); *A63F 13/58* (2014.09); *A63F 13/79* (2014.09)

(58) Field of Classification Search
CPC ......... A63F 13/10; A63F 13/12; A63F 13/537
USPC ................................ 463/1–6, 30–33, 40–42
See application file for complete search history.

(56) References Cited

U.S. PATENT DOCUMENTS

| | | | |
|---|---|---|---|
| 6,733,382 | B2 | 5/2004 | Oe |
| 7,677,979 | B2 | 3/2010 | VanLuchene |
| 7,720,733 | B2 | 5/2010 | Jung |
| 7,870,074 | B2 | 1/2011 | Amsterdam |
| 8,131,740 | B2 | 3/2012 | Cradick |
| 8,321,787 | B2 | 11/2012 | Castelli |

(Continued)

FOREIGN PATENT DOCUMENTS

| | | |
|---|---|---|
| EP | 1145748 | 10/2001 |
| WO | 2005020129 | 3/2005 |

OTHER PUBLICATIONS

Ultima Online Game Manual, Sep. 24, 1997, 114 pgs.

*Primary Examiner* — Omkar A Deodhar
*Assistant Examiner* — Ross A Williams
(74) *Attorney, Agent, or Firm* — Knobbe, Martens, Olson & Bear, LLP (57) ABSTRACT

A system and method for facilitating users to obtain location information in a virtual space is disclosed. Query items may be offered to sell to the users. Upon user activation of the query items, identification information identifying target entities may be obtained from the users. Based on such identification information, location information regarding virtual space locations controlled by or associated with the target entities may be provided to the users. The provided location information may include coordinate information reflecting virtual space coordinates of such locations. In some examples, the level of detail and/or accuracy of such location information provided to the users may be based on the activated query items being specific grades and/or based on levels of the users.

20 Claims, 4 Drawing Sheets

(56) References Cited

U.S. PATENT DOCUMENTS

| | | |
|---|---|---|
| 8,540,566 B2 | 9/2013 | Gregory-Brown |
| 8,977,566 B2 | 3/2015 | Jung |
| 2001/0056383 A1 | 12/2001 | Shuster |
| 2002/0052814 A1 | 5/2002 | Ketterer |
| 2003/0008696 A1 | 1/2003 | Abecassis |
| 2004/0002871 A1 | 1/2004 | Geranio |
| 2006/0111945 A1 | 5/2006 | Tinsley |
| 2006/0178967 A1 | 8/2006 | Jung |
| 2007/0099685 A1 | 5/2007 | VanLuchene |
| 2007/0106576 A1 | 5/2007 | Jung |
| 2008/0220876 A1 | 9/2008 | Mehta |
| 2009/0098939 A1 | 4/2009 | Hamilton |
| 2009/0099925 A1 | 4/2009 | Mehta |
| 2009/0222424 A1 | 9/2009 | Van |
| 2009/0259948 A1 | 10/2009 | Hamilton, II |
| 2010/0124991 A1 | 5/2010 | OSullivan |
| 2010/0161439 A1 | 6/2010 | Hamilton |
| 2012/0129590 A1 | 5/2012 | Morrisroe |
| 2013/0073560 A1 | 3/2013 | Branca |
| 2013/0111359 A1 | 5/2013 | Silbey |

FACILITATING USERS TO OBTAIN INFORMATION REGARDING LOCATIONS WITHIN A VIRTUAL SPACE

FIELD OF THE DISCLOSURE

This disclosure relates to enabling users of a virtual space to query information regarding target entities in the virtual space, the information regarding the target entities including location information regarding virtual space locations controlled by or associated with the target entities.

BACKGROUND

Systems that host virtual spaces are known. In those systems, state information about the virtual spaces is typically presented to the users through virtual space views presented on client computing platforms; and the users typically obtain virtual space information by selecting (e.g., clicking on) virtual space elements appearing in the virtual space views. The virtual space information provided by those systems typically includes statistical information regarding various attributes of the selected virtual space elements, such as health, strength, abilities, skills, powers and levels of the selected virtual space elements. However, it may be difficult for users to identify virtual space locations under the control of or associated with the selected virtual space elements in those systems, for example when the selected virtual space elements control or are associated with virtual space locations not shown in the view.

SUMMARY

One aspect of the disclosure relates to enabling users of a virtual space to obtain information regarding locations under the control of or associated with target entities in the virtual space (herein referred to as "locations of target entity"). The target entities may include virtual space users, avatars, characters controlled by or associated with the virtual space users, automatically controlled virtual space elements, and/or any other entities in the virtual space of interest to the users. Query items enabling users to query information regarding locations of the target entities may be purchased by the users in a virtual store within the virtual space. Upon activation of a query item by a user, the user may be enabled to specify a target entity, e.g., through a graphical query interface presented on a client computing platform associated with the user. Responsive to the user specifying the target entity, information regarding the locations of the target entity may be obtained, which may include coordinate information indicating such locations in the virtual space. This may enable the user to locate the home base(s), realm(s) of influence, resource core(s), region(s) of alliance and/or other types of virtual space locations of the target entity.

In some examples, such information may include attribute information indicating various attributes associated with the locations of the target entity, for example such as production output, resources, defense strength, defense infrastructures of the locations of the target entity, units defending or occupying the locations of the target entity, and/or any other attributes associated with the locations of the target entity. This may enable the user to determine whether to make strategic moves on the locations of the target entity in view of such location information (e.g., whether to attack the locations of the target entity). This may improve monetization opportunities for the provider of the virtual space as the users may desire to purchase the query items for deploying offensives on the locations of the target entities, or for deterring the target entities from attacking the users.

A system configured for may include a server. The server may operate in a client/server architecture with one or more client computing platforms. The client computing platforms may be associated with the users of the virtual space. The server may be configured to execute one or more of a space module, a user module, a store module, a query interface module, a location module and/or other modules.

The space module may be configured to execute an instance of the virtual space in which an online game takes place. The users may interact with virtual space elements and/or with each other through gameplays provided by the online game. The gameplays may include role-playing, first-person shooter, real-time strategy, turn-based strategy, simulation, music and/or rhythm playing, social interaction, twitching and/or any other gameplays. The users may participate in the instance of the virtual space by inputting commands to initiate user actions for controlling one or more of virtual space elements. Upon receiving the user commands initiating the user actions, the space module may be configured to execute the user actions. The user actions executed by the space module may include combat actions enabling users to direct user entities to compete against AI entities and/or against virtual space elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions.

Within the instance of the virtual space, the users may control virtual space locations to generate revenues, productions, resources, troops, culture, wonders, special units and/or any other types of output enabled by the virtual space locations controlled by the users. The user controlled virtual space locations may include virtual space towns, cities, kingdoms, castles, villages, fortresses, land masses, resource cores, and/or any other types of virtual space locations. A resource core is a type of virtual space object that may provide specific raw materials, resources, currencies, substances, and/or any other virtual space elements when harvesting actions are performed by users (e.g., via user characters) with proper skills, equipment, gears, formulas, time duration, and/or any other harvesting parameters. Examples of resource cores controlled by the users may include mines, rivers, wells, oceans, swamp, mountains, forests, boxes, pets, plants, and/or any other types of resource cores.

Within the instance of the virtual space, user controlled avatars, characters, objects (e.g., weapons), and/or any other user controlled elements may be associated with virtual space locations controlled by the users who control these elements. A given virtual space element controlled by a given user may be associated with some or all of the locations of the given user as however predefined by a provider, administrator, moderator, and/or any other entities related to the virtual space. Within the instance of the virtual space, AI entities may be associated with virtual space locations, for example as predefined by the provider, administrator, moderator, and/or any other entities related to the virtual space.

The user module may be configured to access and/or manage one or more user profiles and/or user information associated with users. The user information may indicate inventories of virtual items available to the individual users in the virtual space. The user accounts managed by the user module may include a first user account associated with a first user in the virtual space. The first user account may include user information indicating a first inventory of virtual items available to the first user.

The store module may be configured to present offers to sell virtual items to the users in exchange for virtual currency. The virtual items may include query items, which may be activated by the users for querying information regarding locations of target entities of interest to the users. In some examples, grades may be associated with individual query items. A grade associated with a query item may reflect a level of detail and/or accuracy of the location information to be provided in response to the user activation of the query item, a number of usages provided by the query item, and/or any other aspects of the query item.

The query interface module may be configured to generate graphical query interfaces for presentation on client computing platforms associated with the users responsive to the users activating the query items. The generated graphical query interfaces may include one or more control fields enabling the users to provide identification information identifying target entities whose location information are of interest to the users. The identification information specified by the users through the graphical query interface may indicate, but not limited to, a username or user handle identifying a virtual space user of interest, a user given name or pre-assigned name of an avatar representing the virtual space user of interest, a user given name, a description, a title, and/or any other types of identification information identifying characters or virtual space elements under the control of or associated with a given virtual space user of interest or AI entities, and/or any other types of identification information. In some implementations, the query interface module may present the location information regarding the one or more virtual space locations of the target entity in the graphical query interface responsive to such information being provided by the location module.

The location module may be configured to provide the users location information regarding virtual space locations of the target entities responsive to the users activating query items. In some exemplary implementations, this may involve communicating with the requesting users via interfaces implemented on client computing platforms; composing queries into, for example a virtual space element database or databases based on the identification information identifying the target entities specified by the requesting users through the interfaces, effectuating communication of such a query to the virtual space element database(s) for execution, receiving a result set or result sets from the virtual space element database(s), parsing the result set(s) to obtain the location information regarding the locations of the target entities and/or other operations. The obtained location information may include coordinate information indicating the virtual space locations of the target entities. In some examples, the obtained location information may include attribute information indicating attributes of the virtual space locations of the target entities.

In some exemplary implementations, the location module may be configured to determine a level of accuracy and/or details of the location information to be provided to a requesting user based on the grade of the query item activated by the requesting user and/or a level of the requesting user in the virtual space. A given level of accuracy of the location information may reflect how reliable the location information provided to the requesting user may be. A given level of detail of the location information to be provided to the requesting user may reflect a scope of location information to be provided to the requesting user. The level of accuracy and/or detail of the location information to be provided to the requesting user may be based on a grade being associated with the query item being activated by the requesting user and/or a level of the requesting user in the virtual space. In some exemplary implementations, the location module may be configured to make a given query item unavailable to a requesting user in the inventory of the requesting user after the requesting user has activated the given query item for a number of times. In some exemplary implementations, the location module may be configured to exhaust an amount of resource in a user's inventory when the user activates a query item.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
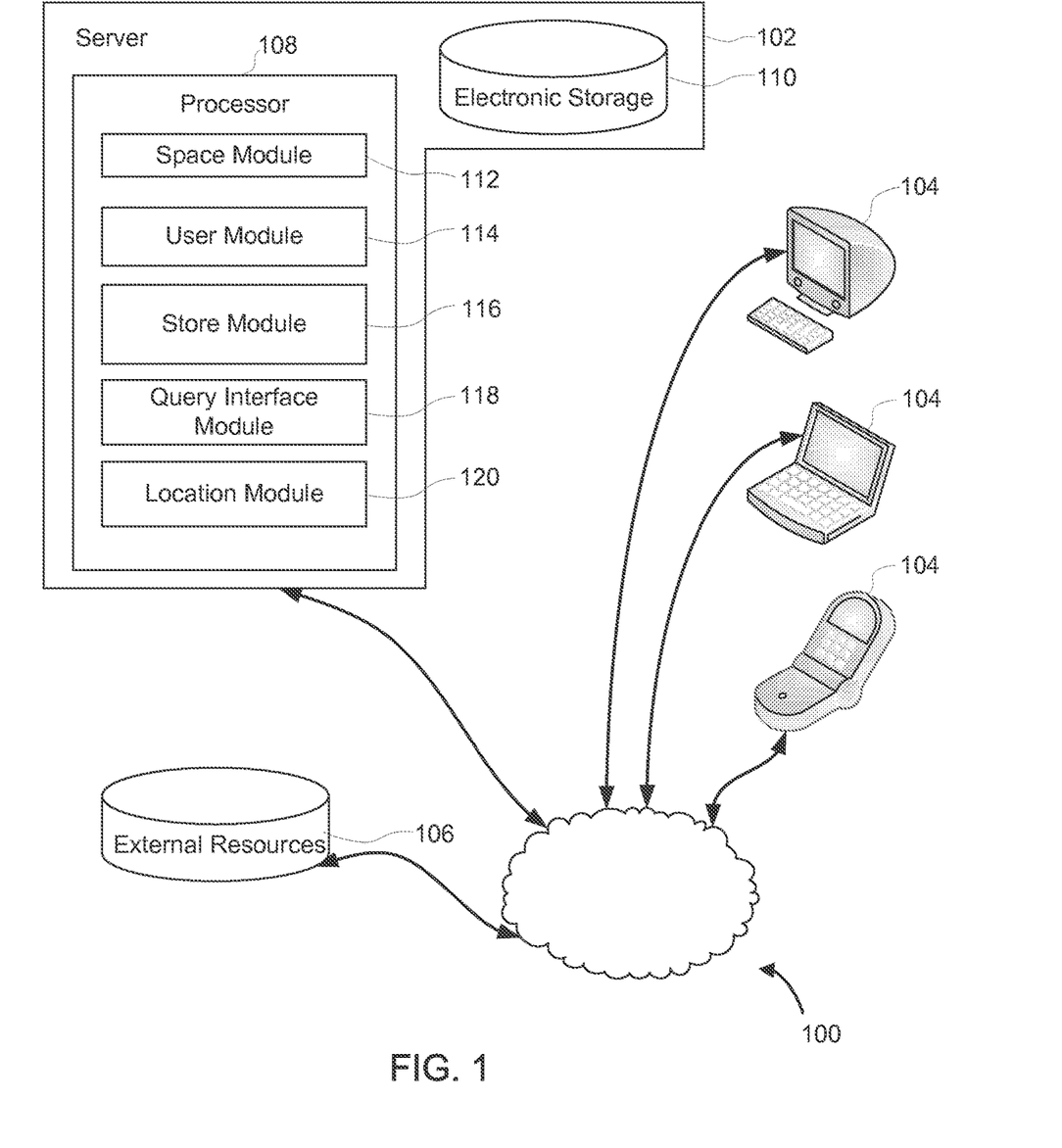
FIG. 1 illustrates one example of a system for facilitating users to obtain information regarding locations within a virtual space in accordance with the disclosure.

FIG. 1 illustrates a system 100 for facilitating users to obtain information regarding locations within a virtual space. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The computer program modules may include one or more of a space module 112, user module 114, store module 116, query interface module 118, location module 120, and/or other modules.

The space module 112 may be configured to execute an instance of the virtual space in which an online game takes place. Within the instance of the virtual space, the users may interact with virtual space elements and/or with each other through gameplays provided by the online game. The gameplays may include role-playing, first-person shooter, real-time strategy, turn-based strategy, simulation, music or rhythm playing, social interaction, twitching and/or any other gameplays. The execution of the instance of the virtual space by space module 112 may include determining the state communicated (e.g., via streaming visual data, via object/position data, and/or other state information) from server 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space may comprise virtual space entities automatically controlled in the instance of the virtual space. Such virtual space entities may not be associated with any user. As such, the automatically controlled virtual space entities may be generated and/or developed by artificial intelligence configured with the server 102 by a provider, administrator, moderator, and/or any other entities related to the virtual space. These automatically controlled entities may evolve within the virtual space free from user controls and may interact with the entities controlled by or associated with the users, other automatically controlled virtual space entities and as well as the topography of the virtual space. Certain manifested traits may be associated with the automatically controlled entities in accordance with the artificial intelligence configured with the server 102. As an illustration, the manifested traits of the automatically controlled virtual space entities may include physical appearances such as age, attire, facial expression, speech style and pattern, response style in reaction to user's interaction, gesture and/or any other traits. As used herein, such automatically controlled virtual space entities in the instance of the virtual space are referred to as "AI entities".

The above description of the manner in which state of the virtual space is determined by space module 112 is not intended to be limiting. The space module 112 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance of the virtual space executed by space module 112, resources may be, for example, generated, cultivated, mined, harvested, purchased, earned, traded and/or gifted over time by units, characters, pets, buildings, facilities and/or any other infrastructure or entity in the virtual space for the user. Resources may be prospected. Resources may be virtual items of value that can be accumulated through participation in the virtual space, rather than virtual items that can only be bought or virtual currencies that may be used to facilitate store and exchange of values in the virtual space. Resources may be virtual items that are accumulated en masse and then used to satisfy resource requirements in the virtual space. By way of non-limiting examples, virtual space resources may include food (e.g., rice, fish, wheat, etc.), wood, minerals (e.g., good, iron, ore, coal, oil, stone, crystal, etc.), plants, animals, virtual items, virtual currencies, and/or any other resources appropriate for the virtual space. Transfer of resources between users may be reflected through user inventories such that the transferor user's inventory reduces an amount of the transferred resources that are added to the transferee user.

Within the instance(s) of the virtual space executed by space module 112, the users may participate in the instance of the virtual space by controlling one or more of an element in the virtual space. The user controlled elements may include avatars, virtual space characters, virtual space units (e.g., troops), objects (e.g., weapons, horses, vehicle and so on), simulated physical phenomena (e.g., wind, rain, earthquakes, and/or other phenomena), and/or other user controlled elements. The user controlled avatars may represent the users in the virtual space. The user characters may include heroes, knights, commanders, leaders, generals and/or any other virtual space entities that may possess strength, skills, abilities, magic powers, knowledge, and/or any other individualized attributes. The virtual space units controlled by the user may include troops and/or any other virtual space entities that may be trained, recruited, captured, and/or otherwise acquired by the users in groups or en mass. Unlike user characters, individual members of a virtual space unit controlled by a given user may share the same strength, skills, abilities, and/or any other attributes. For example, every infantryman in a unit of infantry controlled by a user may have the same attributes in accordance with the characteristics of the unit of infantry. The objects controlled by the users may include weapons, vehicles, projectiles, magic items, wardrobes, boots, armor, knapsacks, medicine, healing potion, and/or any other virtual items that may be employed by the users for interaction with the virtual space.

In any case, the user controlled elements may move through and interact with the virtual space (e.g., AI entities, elements controlled by other users and/or topography in the virtual space). The elements controlled by a given user may be created and/or customized by the given user. The given user may have an "inventory" of virtual goods and/or currency that the given user can use (e.g., by manipulation of a user character or other user controlled elements, and/or other items) within the virtual space.

Controls of virtual elements may be exercised through commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 112).

A given user may input commands with specific parameters through a client computing platform 104 associated with the given user to undertake specific deeds, actions, functions, sphere of actions and/or any other types of interactions within the virtual space. For example, the given user may input commands to construct, upgrade and/or demolish virtual buildings, harvest and/or gather virtual resources, heal virtual user controlled elements, AI entities and/or elements controlled by other users, train, march, transport, reinforce, reassign, recruit, and/or arrange troops, attack, manage, create, demolish and/or defend cities, realms, kingdoms, and/or any other virtual space locations controlled by or associated with the users, craft or transport virtual items, interact with, compete against or along with AI entities and/or virtual space elements controlled by other users in combats, research technologies and/or skills, mine and/or prospect for virtual resources, complete missions, quests, and/or campaigns, exercise magic power and/or cast spells, and/or perform any other specific deeds, actions, functions, or sphere of actions within the virtual space. In some examples, the given user may input commands to compete against elements in an environment within the virtual space—i.e., PvE activities. In some examples, the given user may input commands to compete against each other within the virtual space—i.e., PvP activities.

The space module 112 may be configured to execute user actions to facilitate interaction of the users with the virtual space and/or each other in response to receiving virtual space commands input by the users. Execution of the user action by the space module 112 may produce changes to the virtual space state, which may reflect progresses and/or results of the user actions. In some examples, state changes caused by the execution of the user actions may be recorded in the electronic storage 122 to facilitate persistency throughout the instance of the game space. In some examples, execution of the user actions may not produce persistent changes to the virtual space state (e.g., a user character jumping forward and backward successively may not produce any perceivable game state changes to other users).

The user actions executed by the space module 112 may include combat actions enabling users to direct user entities to compete against AI entities and/or against virtual space elements controlled by other users in combats. The combat actions may include real-time combat actions through which the users may direct user entities (e.g., avatars) to perform maneuvers in real or near-real time; may include turn-based combat actions through which the users may direct user entities (e.g., user character, troops and/or combat equipment) to inflict damages and/or resist damages; may include strategy combat actions through which the users may position the user entities strategically in combats; and/or may include any other types of combat actions.

Within the instance of the virtual space, the users may control virtual space locations to generate revenues, productions, resources, troops, culture, wonders, special units and/or any other types of output enabled by the virtual space locations controlled by the users. The user controlled locations may include virtual space towns, cities, kingdoms, castles, villages, fortresses, land masses, resource cores, and/or any other types of virtual space locations. Typically, through the controlling such virtual locations, the users may grow populations, construct infrastructures, conduct commerce, collect taxes, raise troops, train special units, train knights and/or any other user characters, research technologies, gain skills and/or abilities, and/or undertake any other actions, functions, deeds, sphere of actions as enabled by such virtual space locations. For example, a given user may control multiple cities in the virtual space and the cities may generate revenues to fund the given user activities within the virtual space; may generate troops for defending the cities or attacking other elements in the virtual space; may generate growth in science through research institutes established in those cities; may produce weapons through arsenals established in those cities; may generate production through factories established in those cities; may produce food through farms in those cities and so on.

The users may control resource cores in the virtual space. A resource core is a type of virtual space object that may provide specific raw materials, resources, currencies, substances, and/or any other virtual space elements when harvesting actions are performed by user characters with proper skills, equipment, gears, formulas, time duration, and/or any other harvesting parameters. Resource cores may or may not be visible to the users, depending on the user skills. Resource cores may be depleted due to harvesting actions by users and in some examples may be destroyed in the virtual space. In some examples new resource cores may be created to replace the destroyed ones in the virtual space at times determined by the provider, administrator, moderator, and/or any other entities related to the virtual space. Examples of resource cores may include mines, rivers, wells, oceans, swamp, mountains, forests, boxes, pets, plants, and/or any other virtual space locations or objects.

Within the instance of the virtual space, user controlled avatars, characters, objects (e.g., weapons), and/or any other user controlled elements may be associated with virtual space locations controlled by the users who control these elements. In some examples, such associations may be implicated in the virtual space such that a given user controlled element may be associated with all of the virtual space locations controlled by or associated with the given user. In some other examples, such associations may be implicated in the virtual space such that the given user element may be associated with some of the virtual space location controlled by or associated with the given user as however predefined by the provider, administrator, moderator, and/or any other entities related to the virtual space (e.g., the given user character may be only associated with a location where the user character was originally trained and another a location where the user character is currently being stationed at).

Within the instance of the virtual space, AI entities may be associated with virtual space locations as predefined by the provider, administrator, moderator, and/or any other entities related to the virtual space. For example, an AI character may be associated with a virtual space location such that the AI character is supported by the virtual space location (e.g., through production, resources and/or commerce generated by that virtual space location). The virtual space locations associated with AI entities may be controlled automatically by artificial intelligence configured with server 102 and may evolve in accordance with such artificial intelligence within the virtual space.

Within the instance of the virtual space, levels may be established to facilitate and/or incentivize user advancements. Users may receive virtual points for performing user actions, participating in virtual space activities, interacting with virtual space elements and/or other users, and/or for engaging in any other interactions provided by the virtual space. A user may advance to a next virtual space level when a certain goal has been reached, an end condition has been fulfilled by the user in the virtual space, and/or the virtual points acquired by the user has reached a threshold corresponding to the next level. Advancements in user levels typically result in attribute boosts, skill boosts, resistance boosts, higher status, and/or any other user progressions in the virtual space. In some examples, for different categories of gameplays, skills, abilities, and/or any other areas that may be progressed by users, different levels may be established. For example, experience levels may be established in the virtual space to reflect overall experiences of the users in the virtual space, levels in certain skills may be established to reflect user progressions in acquiring or mastering these skills in the virtual space, and so on.

The user module 114 may be configured to access and/or manage one or more user profiles and/or user information associated with users of the system 100. The one or more user profiles and/or user information may include information stored by server 102, one or more of the client computing platforms 104, and/or other storage locations. The user information may indicate inventories of virtual items available to the individual users in the virtual space. An inventory of virtual items associated with a given user may list virtual objects, virtual resources, virtual space characters and/or units associated with the given user or under control of the user and/or any other virtual space elements of the given user at a time of inventory inquiry.

The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users. The user information managed by the user module 114 may include information indicating levels of interaction with the virtual space by individual users. The interaction level of an individual user as indicated in such information may reflect an amount of interaction with the virtual space by the individual user.

The store module 116 may be configured to present offers to sell virtual items to the users in exchange for virtual currency. This may involve presenting the offers through an interface representing a virtual store provided by the virtual space. Such an interface may be implemented on client computing platforms 104 and the users may be enabled to purchase virtual items included in the offers presented through the interface. The virtual store may include a shop run by the provider of the virtual space wherein virtual items are sold, an auction house run by administrator(s) of the virtual space, a trading place run by users of the virtual space, and/or any other types of virtual store. The virtual items purchased by users through the virtual store may be added to the inventories of the users and may be activated by the users to facilitate user participation in the virtual space.

The virtual items included in the offer presented by the store module 116 may include query items. Query items purchased by users through the virtual store(s) in the virtual space may be activated by the users for querying information regarding locations of the target entities of interest to the users. In some examples, grades may be associated with individual query items. A grade associated with a given query item may reflect a level of detail and/or accuracy of the location information to be provided in response to the user activation of the given query item, a number of usages provided by the query item before expiration, and/or any other aspects of the given query item.

The query interface module 118 may be configured to generate graphical query interfaces for presentation on client computing platforms associated with the users responsive to the users activating the query items. The graphical query interfaces generated by query interface module 118 may be presented to the user through electronic displays coupled to or included in the client computing platforms 104. The generated graphical query interfaces may include one or more control fields. A control field may be configured to receive inputs from users indicating identification information identifying a target entity within the virtual space. In some implementations, the control field enabling the users to specify target entities may include a textual input box through which the user may input texts of the identification information identifying the target entities. Such identification information may include, but not limited to, a username or user handle identifying a virtual space user of interest, a user given name or pre-assigned name of an avatar representing the virtual space user of interest, a user given name, a description, a title, and/or any other types of identification information identifying characters or virtual space elements under the control of or associated with the virtual space user of interest or AI entities. Upon receiving the identification information identifying a target entity from a user, the query interface module 118 may generate a command to instruct, e.g., the location module 120 to obtain location information regarding the locations of the target entity. In some implementations, the query interface module 118 may present the location information regarding the one or more virtual space locations of the target entity in first graphical query interface responsive to such information being provided by the location module 120. An example of graphical query interface generated by the query interface module 118 will be described in FIGS. 2A-D.

The location module 120 may be configured to obtain from users (i.e. the requesting users) identification information identifying target entities in the virtual space and to provide the users location information regarding virtual space locations under the control of or associated with the target entities responsive to the users activating query items. In some exemplary implementations, this may involve communicating with the requesting users via interfaces implemented on client computing platforms 104. Such interfaces may include a graphical interface such as the graphical query interface generated by the query interface module 118, a voice interface that enable the requesting users to transmit such identification information through voice commands, a gesture interface that enable the requesting users to transmit gestures as such identification information, and/or any other interfaces that may enable the communication of such identification information between the location module 120 and the requesting users. In those implementations, upon obtaining the identification information identifying the target entities from the requesting users, the location module 120 may be configured to compose queries into, for example a virtual space element database(s) employed by the system 100 (not shown in this example for clarity) or provided by a third entity associated with the provider of the system 100. The queries composed by the location module 120 may be based on the identification information identifying the target entities specified by the requesting users. For example, a SQL select query may be composed by the location module 120 to select location information regarding all locations of a target entity. In those implementations, the location module 120 may be configured to effectuate communication of such a query to the virtual space element database for execution and receive a result set from the virtual space element database(s). In those implementations, the location module 120 may be configured to parse the result set(s) received from the virtual space element database obtain the location information regarding the locations of the target entities of interest to the requesting user. The obtained location information may include coordinate information indicating coordinates of the virtual space locations of the target entities. The coordinate information may indicate centers of the virtual space locations of the target entities (e.g., in the forms of X and Y coordinates), virtual space areas in which the virtual space locations of the target entities are located, or any other types of coordinate information. One example of such coordinate information is illustrated in FIG. 3B.

In some examples, the obtained location information may include attribute information indicating attributes of the virtual space locations of the target entities. Examples of the attributes may include location names, defense strength, defense infrastructure, buildings, production rate or output, food storage, growth rate, happiness, health, commerce and/or maintenance costs of, one or more units occupying, and/or one or more virtual resources accessible to or produced by the virtual space locations of the target entities.

In some exemplary implementations, for providing the location information to a requesting user, the location module 120 may be configured to determine a level of accuracy and/or details of the location information to be provided to the requesting users based on the grade of the query item activated by the requesting user and/or a level of the requesting user in the virtual space. For facilitating such determinations by the location module 120, association table(s) specifying associations between the levels of accuracy and/or details of the location information to be provided to requesting users, and grades of query items and/or the user levels may be, for example predefined by the provider, administrator, moderator, and/or any other entities related to the virtual space and stored in the electronic storage 110 at a configuration stage of the system 100 in some examples; or may be dynamically established at runtime according to programming rules configured with the server 102. A given level of accuracy of the location information may specify how reliable the location information may be provided to the requesting user. For example, a level 1 accuracy may specify that certain amount of faulty information may be inserted into the location information or certain amount of the location information obtained from the virtual space element database(s) by the location module 120 may be obscured (e.g., by enlarging the scope of the coordinate information from an exact point of location in the virtual space to an area in the virtual space); a level 2 of accuracy may specify more accurate location information to be provided to the requesting user with less amount of faulty information and/or obscurity than that provided to the requesting user with level 1 of accuracy; and so on. For example, at the level 1 of accuracy, the location information provided by the location module 120 may only include coordinate information indicating areas in which the locations of the target entities are located and imprecise names of those locations; the location information provided by the location module 120 may include the coordinate information and precise names of those locations; and so on.

A given level of detail of the location information to be provided to the requesting user may specify the scope of such location information to be provided to the requesting user. The levels of details determined by the query interface module 118 may be distinguished by a number of and/or types locations of the target entity whose information is to be provided (e.g., 5 cities controlled by the target entity, all mines controlled by the target entity and so on), specific kinds of location information to be provided (e.g., defense, production, resource, units, and so on), amount of the location information (e.g., a general number indicating production output vs. itemized production list), and/or any other aspects that may be used to distinguish different levels of details of the location information to be provided to the requesting user as desired by the provider, administrator, moderator, and/or any other entities related to the virtual space. For example, a level 1 of detail may specify that the location information to be provided to the requesting user may only indicate coordinate information of the locations; a level 2 of detail may specify the location information to be provided may indicate the coordinate information and location defense information; a level 3 detail may indicate the coordinate information, location defense information, and location production information; a level 4 detail may indicate the coordinate information, location defense information, location production information, and resource information; and so on.

In any case, the level of accuracy and/or detail of the location information to be provided to a requesting user may be determined by the location module based on a grade associated with the query item activated by the requesting user and/or a level of the requesting user in the virtual space. This may involve obtaining the grade of the query item and/or level information regarding the requesting user from user information associated with the given user as managed by the user module 114, examining an accuracy-detail/item grade-user level association table or tables for a determination a level of detail and/or accuracy of the detail of the location information to be provided to the requesting user based one the grade of the query item activated by the requesting user and/or the level of the requesting user, and/or other operations.

In some exemplary implementations, the location module 120 may be configured to make a given query item unavailable to a requesting user in the inventory of the requesting user after the requesting user has activated the given query item for a number of times for querying location information regarding virtual space locations of one or more target entities. That is, in those implementations, the query items may be consumed (i.e., expired) in the virtual space after the users have used query items for a number of times. The number of times for an individual query item to be used in the virtual space may be predefined by the provider, administrator, moderator, and/or any other entities related to the virtual space. For example, it may be predetermined that a given query item may be expired after a requesting user has used it five times.

In some exemplary implementations, the location module 120 is configured to exhaust an amount of resource in a user's inventory at the user activation of a query item. For example, it may be predetermined by the provider, administrator, moderator, and/or any other entities related to the virtual space such that activation of a query item by a user for querying location information regarding virtual space locations of target entities may exhaust an amount of gold, coal, lumber, stone and/or any other types of resources in the user's inventory. That is, in those exemplary implementations, it may be predetermined that activation of query items will cost resources of the users who activate the query items.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118, 120. Processor 108 may be configured to execute modules 112, 114, 116, 118, 120 by software; hardware; firmware; some combination of software, hardware, and/or firmware; and/or other mechanisms for configuring processing capabilities on processor 108.

It should be appreciated that although modules 112, 114, 116, 118, 120 are illustrated in FIG. 1 as being co-located within a single processing unit, in implementations in which processor 108 includes multiple processing units, one or more of modules 112, 114, 116, 118, 120 may be located remotely from the other modules. The description of the functionality provided by the different modules 112, 114, 116, 118, 120 described below is for illustrative purposes, and is not intended to be limiting, as any of modules 112, 114, 116, 118, 120 may provide more or less functionality than is described. For example, one or more of modules 112, 114, 116, 118, 120 may be eliminated, and some or all of its functionality may be provided by other ones of modules 112, 114, 116, 118, 120. As another example, processor 108 may be configured to execute one or more additional modules that may perform some or all of the functionality attributed below to one of modules 112, 114, 116, 118, 120.

Figure 2A:
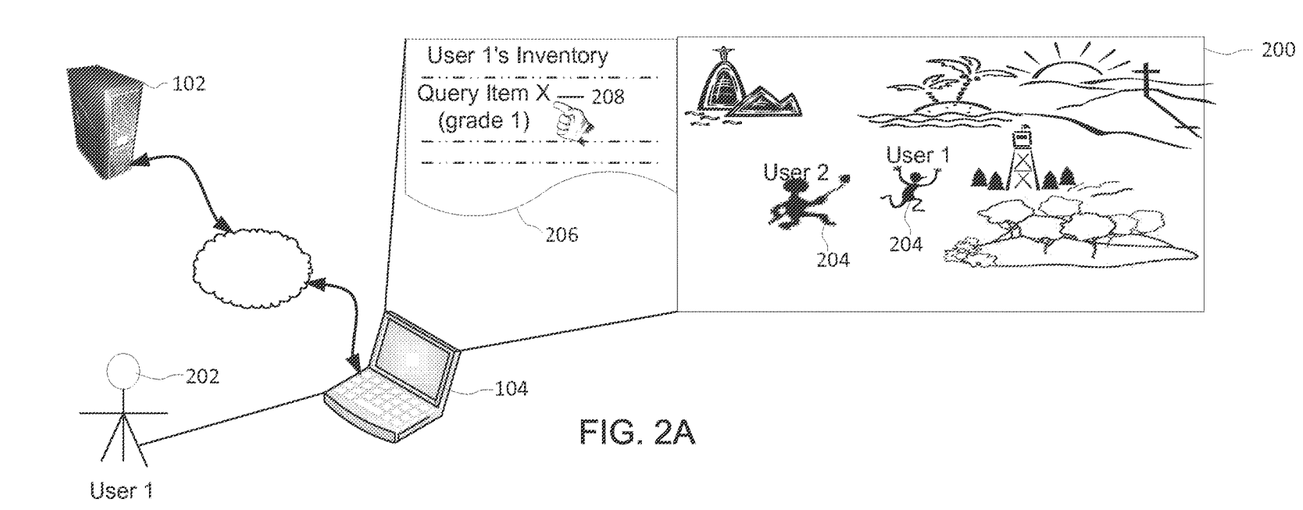
FIG. 2A illustrates an example of user activating a query item in an instance of virtual space provided by the system shown in FIG. 1.

FIGS. 2A-D illustrate various examples of using system 100 shown in FIG. 1 for facilitating users to obtain information regarding locations within a virtual space. They will be described with references to FIG. 1. FIG. 2A illustrates an example of user activating a query item in an instance of virtual space provided by the system 100. As shown, a view 200 reflecting a state of a virtual space provided by server 102 may be implemented on a client computing platform 104 associated with a user 202, user 1 in this example. As illustrated, in the view 200, user 1 is engaging in a combat with another user in the virtual space—i.e., user 2 in this example via user characters 204 controlled by users 1 and 2 respectively. As shown, user 1 has an inventory 208 of virtual items comprising a query item x 208. As shown, the query item x 208 in this example is grade 1 as determined by a provider of the virtual space. As illustrated, user 1 activates the query item x 208 in this example for querying location information regarding virtual space locations of user 2 in order to determine whether to make strategic moves on one or more of those locations.

Figure 2B:
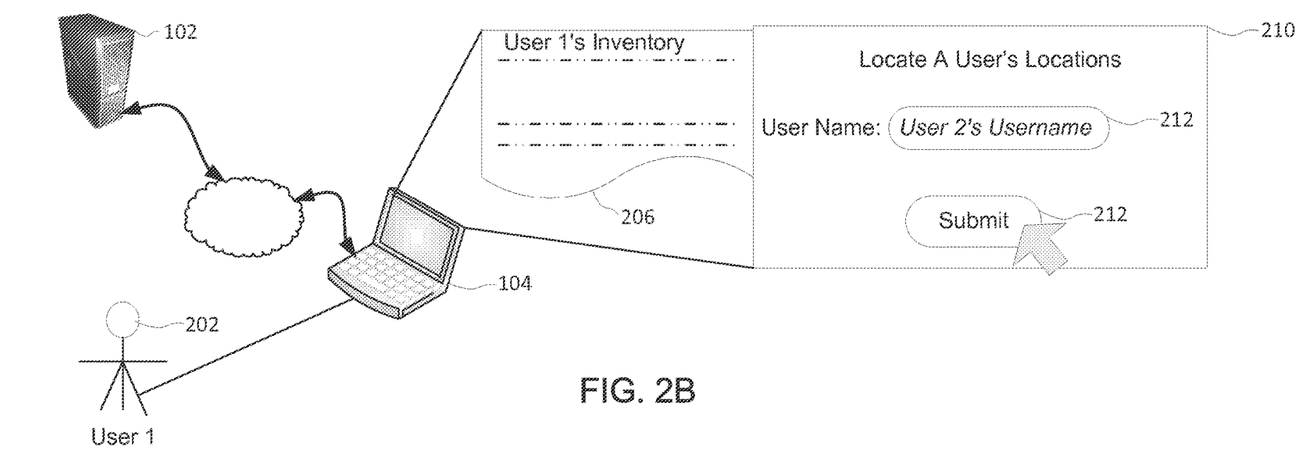
FIG. 2B illustrates an example of enabling a user to a specify target entity for querying location information regarding the locations of the target entity.

FIG. 2B illustrates an example of enabling a user to specify target entity for querying location information regarding the locations of the target entity. As shown, a graphical query interface 210 may be presented to the user 202 responsive to the activation of the query item 208 by user 1 as illustrated in FIG. 2A. It should be appreciated that although the view 200 of the virtual space is not shown in FIG. 2B, the graphical query interface 210 may form a part of the view 200 in some examples. In some other examples, the graphical query interface may be presented on the client computing platform 104 to replace the view 200 of the virtual space. In any case, as illustrated in FIG. 2B, control fields 212 may be provided to enable the user to input identification information identifying a target entity. In this example, user 1 inputs user 2's username as shown. It should be noted that in this example, the query item x 208 is made unavailable (i.e. expired or consumed) to the user 1 in the user 1's inventory at user 1 activating of the query item x 208 such that user 1 may not access the query item x again.

Figure 2C:
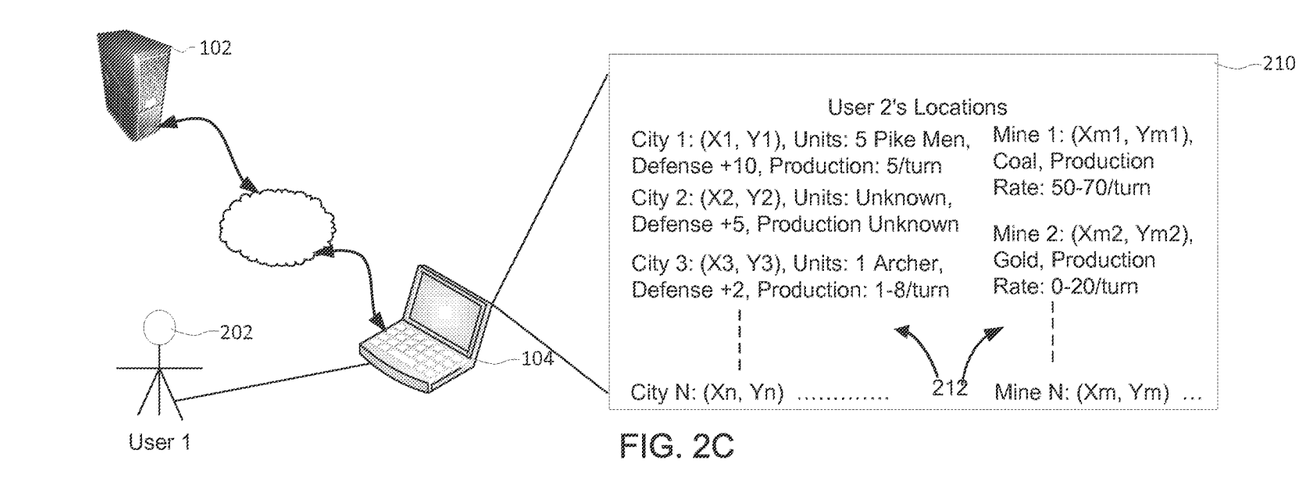
FIG. 2C illustrates an example of providing location information regarding the virtual space locations of a target entity through a client computing platform.

FIG. 2C illustrates an example of providing location information regarding the virtual space locations of user 2. As shown in this example, location information 212 regarding one or more cities and/or resource cores (e.g., mines) may be displayed in the graphical query interface 210. In this example, the level of accuracy and details of the location information 212 provided to user 1 is determined based on the query item x being grade 1. For example, as illustrated, the location information 212 indicating city 2 controlled by the User 2 is presented as "Unknown" and ranges of production by the mines controlled by user 2 are provided instead of exact values.

Figure 2D:
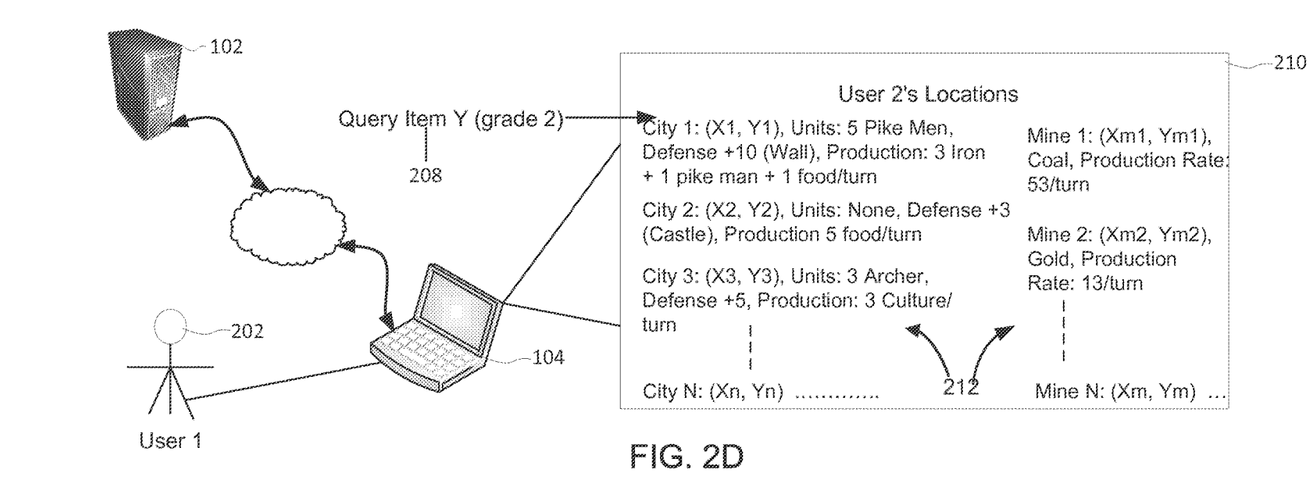
FIG. 2D illustrates another example of providing location information regarding the virtual space locations of the target entity described in FIG. 2C.

FIG. 2D illustrates another example of providing location information regarding the virtual space locations of user 2. As shown in this example, the user 202, i.e. user 1 may activate a grade 2 query item, i.e. query item Y 208 for querying location information 212 regarding virtual space locations of user 2. In this example as shown, the level of detail and accuracy of the location information 212 is presented to the user 1 in the graphical query interface 210 based on the query item Y being grade 2. For example, the information 212 presented as unknown in FIG. 2C is displayed with substance in this FIG. 2D since the query item Y being grade 2. Also shown is that some of the location information 212 presented in FIG. 2D is more accurate than that presented in FIG. 2C (e.g., the defense of city 2). Also shown in the graphical query interface 210 in FIG. 2D are more details of the location information 212 as compared to that in FIG. 2C (e.g., itemized production information as opposed to a general number in FIG. 2C, detail defense infrastructure information is provided, exact values instead of the range values in FIG. 2C are provided and so on).

Figure 3:
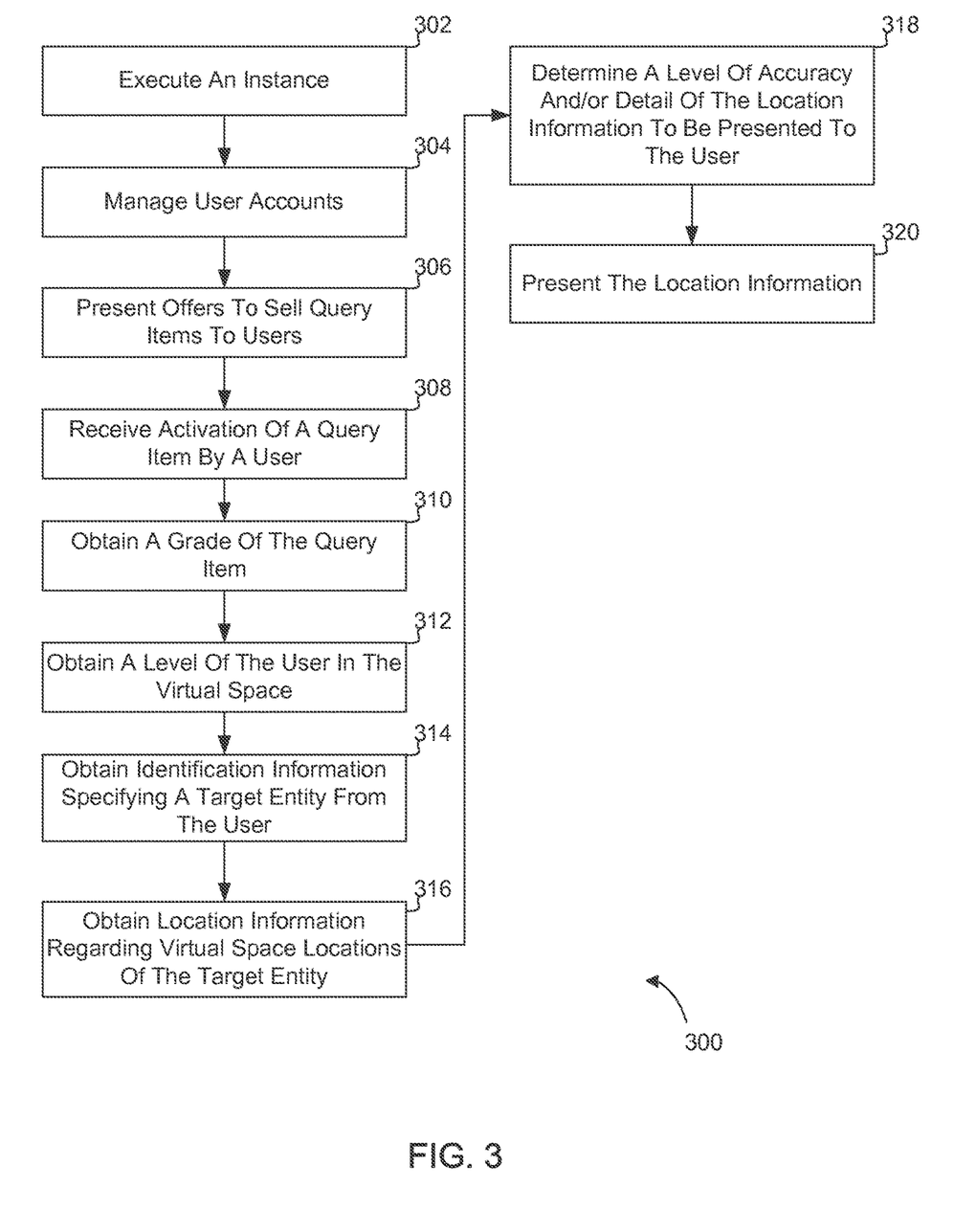
FIG. 3 illustrates one exemplary method for facilitating users to obtain information regarding locations within a virtual space.

FIG. 3 illustrates one exemplary method 300 for facilitating users to obtain information regarding locations within a virtual space in accordance with the disclosure. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed and implemented to determine view information for transmission to one or more client computing platforms associated with users. The users may interact with the virtual space by initiating virtual space commands to perform user actions. The user actions may be executed in the virtual space. In some implementations, operation 302 may be performed by a space module the same as or similar to space module 112 (shown in FIG. 1 and described herein).

At an operation 304, user accounts associated with the users may be managed. The user accounts may include a first account associated with the first user. The first account may include an inventory of virtual items for the first user. In some implementations, operation 304 may be performed by a user module the same as or similar to user module 114 (shown in FIG. 1 and described herein).

At operation 306, query items may be offered to sell to the users of the virtual space in a virtual store. Such query items purchasable by the users may be activated by the users to query information regarding virtual space locations of target entities. In some examples, grades may be associated with individual query items to reflect levels of details and/or accuracy of the location information that may be provided by the individual query items, number of usages provided by the individual query items, and/or any other aspects that may distinguish the query items of different grades. In some implementations, operation 306 may be performed by a user module the same as or similar to user module 116 (shown in FIG. 1 and described herein).

At an operation 308, activation of a query item by a user may be received. In some implementations, operation 308 may be performed by a space module the same as or similar to space module 112 (shown in FIG. 1 and described herein).

At an operation 310, a grade associated with the query item activated in operation 308 may be obtained. The obtained grade may include a numerical value (e.g., level 1, 2, 3, 4 and so on), a textual description (e.g., "entry level spy glass", "intermediate level of spy glass", "master level of spy glass", and so on), and/or any other values indicating a grade of the query item. In some implementations, operation 310 may be performed by a location module the same as or similar to location module 120 (shown in FIG. 1 and described herein).

At an operation 312, a level of the user who activated the query item in operation 306 may be obtained. The obtained level of the user may reflect an amount of experience (e.g., experience points), skills (skill points), abilities (e.g., ability points), and/or any other types of progression made by the user in the virtual space. In some implementations, operation 312 may be performed by a location module the same as or similar to location module 120 (shown in FIG. 1 and described herein).

At an operation 314, identification information specifying a target entity from the user may be obtained. The identification information obtained in operation 314 may include, but not limited to, a username or user handle identifying a virtual space user of interest, a user given name or pre-assigned name of an avatar representing the virtual space user of interest, a user given name, a description, a title, and/or any other types of identification information identifying characters or virtual space elements under the control of or associated with the virtual space user of interest or AI entities. In some implementations, operation 314 may be performed by a location module the same as or similar to location module 120 (shown in FIG. 1 and described herein).

At an operation 316, location information regarding virtual space locations of the target entity specified in operation 314 may be obtained. In some exemplary implementations, this may involve communicating with the requesting users via interfaces implemented on client computing platforms; composing queries into, for example a virtual space element database(s) based on the identification information identifying the target entities specified by the requesting users through the interfaces, effectuating communication of such a query to the virtual space element database(s) for execution, receiving a result set or result sets from the virtual space element database(s), parsing the result set(s) received to obtain the location information regarding the locations of the target entities of interest to the requesting user and/or other operations. The obtained location information may include coordinate information indicating coordinates of the virtual space locations of the target entities. In some implementations, operation 316 may be performed by a location module the same as or similar to location module 120 (shown in FIG. 1 and described herein).

At an operation 318, a level of accuracy and/or details of the location information to be provided to the user may be determined based on the level of the user and/or the grade of the query item. In some examples, this may involve obtaining the grade of the query item and/or level information regarding the requesting user from user information associated with the given user, examining an accuracy-detail/item grade-user level association table or tables for a determination a level of detail and/or accuracy of the detail of the location information to be provided to the requesting user based one the grade of the query item activated by the requesting user and/or the level of the requesting user, and/or other operations. In some implementations, operation 318 may be performed by a location module the same as or similar to location module 120 (shown in FIG. 1 and described herein).

At an operation 320, the location information obtained in operation 316 may be presented to the user in accordance with the level of detail and/or accuracy determined in operation 318. In some implementations, operation 320 may be performed by a query interface module the same as or similar to query interface module 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating users to obtain location information in a virtual space, the system comprising:
   one or more processors configured by machine-readable instructions to:
   execute an instance of the virtual space in which an online game takes place, to use the instance of the virtual space to facilitate presentation of the virtual space to users on client computing platforms associated with the users, and to facilitate interaction of the users with the virtual space and/or each other by executing actions in the instance of the virtual space in response to commands received over a network from the client computing platforms associated with the users, the users including a first user and a second user;
   manage user accounts comprising user information associated with individual ones of the users, such user information including inventories of virtual items available to the individual ones of the users in the virtual space, the user accounts including a first user account associated with the first user and a second user account associated with the second user, the first user account including a first inventory of virtual items available to the first user in the virtual space;
   present offers to sell virtual items to the users in exchange for virtual currency, the virtual items including query items;
   update the first inventory of virtual items available to the first user to include a first query item responsive to receiving acceptance of a first offer to sell a first query item by the first user; and
   obtain from the client computing platforms associated with the users, identification information identifying target entities in the virtual space and, responsive to the users activating query items, provide location information regarding virtual space locations under the control of or associated with the target entities to the users, the location information provided including coordinate information indicating virtual space locations under the control of or associated with the target entities in the virtual space such that responsive to the first user activating a first query item within the first inventory and specifying the second user and/or an entity associated with the second user as a target entity, first location information regarding a virtual space location under the control of or associated with the second user and/or the entity associated with the second user is provided to the first user.

2. The system of claim 1, wherein the one or more processors are further configured by machine-readable instructions such that the entity associated with the second user includes one or more of an avatar representing the second user within the virtual space, and/or a virtual space element under the control of or associated with the second user.

3. The system of claim 1, wherein the one or more processors are configured by machine-readable instructions such that the first location information further includes information indicating at least one of location names, defense strength, defense infrastructure, buildings, production rate or output, food storage, growth rate, happiness, health, commerce and/or maintenance costs of, one or more units occupying, and/or one or more virtual resources accessible to or produced by the virtual space location under the control of or associated with the second user and/or an entity associated with the second user.

4. The system of claim 1, wherein the one or more processors are further configured by machine-readable instructions such that individual ones of the query items presented in the offers to sell to the users in exchange for virtual currency are distinguished by grades associated with the individual ones of the query items such that the first query item is associated with a first grade, and wherein providing the first user the first location information comprises a determination of a level of accuracy and/or a level of details of the first location information based on the first query item being associated with the first grade.

5. The system of claim 1, wherein the one or more processors are further configured by machine-readable instructions such that the user information includes first user level information indicating a level of the first user in the virtual space, and wherein providing the first user the first location information comprises a determination of a level of accuracy and/or a level of details of the first location information based on the first user level information.

6. The system of claim 1, wherein the one or more processors are further configured by machine-readable instructions such that responsive to the first user activating the first query item for a number of times, the first query item is made unavailable to the first user in the first inventory.

7. The system of claim 1, wherein the one or more processors are further configured by machine-readable instructions such that the virtual items in the user inventories including virtual recourses acquired by the users and such that responsive to the first user activating the first query item, a quantity of virtual resource acquired by the first user in the first inventory is reduced.

8. The system of claim 1, wherein the one or more processors are further configured by machine-readable instructions to generate graphical query interfaces for presentation on client computing platforms associated with the users responsive to the users activating the query items, the query interfaces comprising controls enabling the users to provide identification information identifying target entities such that responsive to the first user activating the first query item, a first graphical query interface is generated for presentation on a first client computing platform associated with the first user, the first graphical query interface comprising controls enabling the first user to provide identification information identifying the second user and/or the entity associated with the second user.

9. The system of claim 8, wherein the one or more processors are further configured by machine-readable instructions to present the first location information in the first graphical query interface responsive to the first location information being provided to the first user.

10. The system of claim 1, wherein the one or more processors are further configured by machine-readable instructions such that responsive to a second user activating a second query item, the second user is provided second location information regarding a second virtual space location under the control of or associated with a second target entity specified by the second user.

11. A method for facilitating users to obtain location information in a virtual space, the method being implemented in one or more physical processors configured to execute machine-readable instructions, the method comprising:

executing, by the one or more processors, an instance of the virtual space in which an online game takes place, using the instance of the virtual space to facilitate presentation of the virtual space to users on client computing platforms associated with the users, and facilitating interaction of the users with the virtual space and/or each other by executing actions in the instance of the virtual space in response commands received over the network from the client computing platforms associated with the users, the users including a first user and a second user;

managing, by the one or more processors, user accounts comprising user information associated with individual ones of the users, such user information including inventories of virtual items available to the individual ones of the users in the virtual space, the user accounts including a first user account associated with the first user and a second user account associated with the second user, the first user account including a first inventory of virtual items available to the first user in the virtual space;

presenting, by the one or more processors, offers to sell virtual items to the users in exchange for virtual currency, the virtual items including query items; and updating, by the one or more processors, the first inventory of virtual items available to the first user to include a first query item responsive to receiving acceptance of a first offer to sell a first query item by the first user;

obtaining, by the one or more processors from the client computing platforms associated with the users, identification information identifying target entities in the virtual space and, responsive to the users activating query items, providing location information regarding virtual space locations under the control of or associated with the target to the users, the location information provided including coordinate information indicating virtual space locations under the control of or associated with the target entities in the virtual space such that responsive to the first user activating a first query item within the first inventory and specifying the second user and/or an entity associated with the second user as a target entity, providing the first location information regarding a virtual space location under the control of or associated with the second user and/or the entity associated with the second user is provided to the first user.

12. The method of claim 11, wherein the entity associated with the second user includes one or more of an avatar representing the second user within the virtual space, and/or a virtual space element under the control of or associated with the second user.

13. The method of claim 11, wherein the first location information further includes information indicating at least one of location names, defense strength, defense infrastructure, buildings, production rate or output, food storage, growth rate, happiness, health, commerce and/or maintenance costs of, one or more units occupying, and/or one or more virtual resources accessible to or produced by the virtual space location under the control of or associated with the second user and/or an entity associated with the second user.

14. The method of claim 11, wherein individual ones of the query items presented in the offers to sell to the users in exchange for virtual currency are distinguished by grades associated with the individual ones of the query items such that the first query item is associated with a first grade, and wherein providing the first user the first location information comprises a determination of a level of accuracy and/or a level of details of the first location information based on the first query item being associated with the first grade.

15. The method of claim 11, wherein the user information includes first user level information indicating a level of the first user in the virtual space, and wherein providing the first user the first location information comprises a determination of a level of accuracy and/or a level of details of the first location information based on the first user level information.

16. The method of claim 11, further comprising making the first query item unavailable to the first user in the first inventory responsive to the first user activating the first query item for a number of times.

17. The method of claim 11, wherein the virtual items in the user inventories including virtual recourses acquired by the users, and the method further comprising responsive to the first user activating the first query item, reducing a quantity of virtual resource acquired by the first user in the first inventory.

18. The method of claim 11, further comprising generating graphical query interfaces for presentation on client computing platforms associated with the users responsive to the users activating the query items, the query interfaces comprising controls enabling the users to provide identification information identifying target entities such that responsive to the first user activating the first query item, generating a first graphical query interface for presentation on a first client computing platform associated with the first user, the first graphical query interface comprising controls enabling the first user to provide identification information identifying the second user and/or the entity associated with the second user.

19. The method of claim 18, further comprising presenting the first location information in the first graphical query interface responsive to the first location information being provided to the first user.

20. The method of claim 11, further comprising responsive to a second user activating a second query item, providing the second user location information regarding a second virtual space location under the control of or associated with a second target.

* * * * *